(12) United States Patent
Komiya

(10) Patent No.: US 7,250,572 B2
(45) Date of Patent: Jul. 31, 2007

(54) CABLE CLAMP MEMBER FOR CABLE PROTECTIVE GUIDE DEVICE

(75) Inventor: Shoichiro Komiya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 9 days.

(21) Appl. No.: 11/362,560

(22) Filed: Feb. 24, 2006

(65) Prior Publication Data
US 2006/0219848 A1 Oct. 5, 2006

(30) Foreign Application Priority Data
Mar. 30, 2005 (JP) .............................. 2005-098742

(51) Int. Cl.
*H02G 15/02* (2006.01)

(52) U.S. Cl. ................ 174/70 R; 174/71 R; 174/72 R; 174/74 R; 248/49; 248/68.1

(58) Field of Classification Search .................. 248/49, 248/68.1, 74.2, 67.5, 79, 92, 316.1; 174/70 R, 174/70 C, 71 R, 72 R, 72 TR, 68.1, 36, 69, 174/99 E, 136, 117 F, 117 FF; 59/78, 78.1; 191/12 C, 12 R
See application file for complete search history.

(56) References Cited

U.S. PATENT DOCUMENTS 6,653,569 B1 * 11/2003 Sung ........................ 174/88 R
7,132,602 B1 * 11/2006 Komiya ..................... 174/70 R
7,204,075 B2 * 4/2007 Utaki .......................... 59/78.1
2004/0084573 A1 * 5/2004 Komiya ........................ 248/49
2005/0006534 A1 * 1/2005 Shillings ..................... 248/68.1
2006/0113432 A1 * 6/2006 Driskell ..................... 248/68.1

FOREIGN PATENT DOCUMENTS

WO    WO 98/21503    5/1998

* cited by examiner

*Primary Examiner*—Ramon O Ramirez
(74) *Attorney, Agent, or Firm*—Woodling, Krost & Rust

(57) ABSTRACT

The present invention provides a cable clamp member capable of reducing the providing cost or manufacturing cost of a device and surely clamping stored cables to a moving end or a fixed end flexibly in conformation to the size or layout of stored cables. The cable clamp member comprises a comb-tooth unit installation receiving member 121 provided on an end part 120 at a fixed end or a moving end and having a plurality of engaged parts 121a provided in a width direction so that a comb-tooth installation position is changeable, and a clamp comb-tooth unit member 122 to be detachably engaged with and installed to any one of the plurality of engaged parts to clamp a cable mounted in the installed state to the device. The plurality of engaged parts 121a are provided on the comb-tooth unit installation receiving member 121 at narrow intervals so as to minutely adjust the installation pitch of the clamp comb-tooth unit member 122.

4 Claims, 8 Drawing Sheets

CABLE CLAMP MEMBER FOR CABLE PROTECTIVE GUIDE DEVICE

This patent application claims priority to Japanese Patent Application 2005-098742 filed Mar. 30, 2005.

TECHNICAL FIELD

The present invention relates to a cable protective guide device suitable for safely and surely protecting and guiding cables such as electric cables for transmitting electric signal or supplying electric power or hoses for supplying oil pressure or air pressure, which connect a moving part to a stationary part, for example, in an industrial machine, a semiconductor chip mounter, a vehicle or the like even during movement of the moving part, as well as storing the cables and, more specifically, relates to a cable clamp member used to clamp (fix) cables at a moving end or fixed end of the cable protective guide device.

BACKGROUND ART

Conventionally, as this kind of cable clamp member for cable protective guide device, a mounting unit provided on a chain member such as a moving end or fixed end located at an end part of the cable protective guide device is known (for example, refer to Patent Document 1).

In general, if a cable is protectively guided by this kind of cable protective guide device without clamping both ends of the stored cable to the cable protective guide device, respectively, slippage in motion is caused between the stored cable and the device, for example, when the device is moved in accordance with a moving part of an industrial machine, and the stored cable may be rubbed with the cable protective guide device or with another stored cable within a cable storage space and damaged by sliding wear or the like.

Therefore, measures have been taken in the past to use a cable clamp member such as the above-mentioned mounting unit to clamp the stored cable to the cable protective device at both ends thereof, thereby suppressing the slippage in motion between the stored cable and the cable protective device in the movement of the device as much as possible to prevent the damage of the stored cable.

Patent Document 1 is Japanese Patent Publication No. 2001-504199.

Problems to be Solved by the Invention

However, since the above-mentioned related art is adapted to form a predetermined fixed number of bridging pieces for clamping cables on the mounting unit in an integrated manner, it has the problem of a high manufacturing cost, in addition to waste of the material cost, which is resulted from that surplus bridging pieces are left unused in a usage pattern in which the number of cables to be stored is smaller than the fixed number.

Further, since the related art is adapted to stationarily set the bridging pieces on the mounting unit at rough intervals in an integrated manner, it has the problem that the storage position of the cables to be stored may be shifted from the formed position of the stationarily set bridging pieces depending on the size or layout of the cables to be stored, whereby the cables cannot be neatly arranged and clamped, and unreasonable force may act on the cables to damage the cables.

In the related art, further, a change in width dimension of the cable protective guide device needs manufacturing of a mounting unit of another size matched thereto. Namely, since a die for manufacturing a mounting unit integrated with a plurality of bridging pieces is prepared to manufacture the mounting unit by use of a resin material or the like, a plurality of dies for manufacturing such a complicated mounting unit need to be prepared, resulting in a significantly increased manufacturing cost.

The related art is adapted to clamp, at the time of clamping thick cables, one thick cable to one narrow bridging piece by a band of Nylon (trademark) or the like, or clamp one thick cable to two narrow bridging pieces by the band or the like. Namely, in a usage pattern where a bridging piece matched to the width of a cable to be stored is not present, it is difficult to surely clamp the cable to the cable protective guide device. As a result, slippage in motion is caused between the cable and the device during movement of the device, and the stored cable is rubbed with the device or with another stored cable in the cable storage space and damaged by sliding wear or the like.

The present invention thus has been made to solve the above-mentioned problems, and provides a cable clamp member capable of reducing the providing cost or manufacturing cost of the device, and surely clamping stored cables to a moving end or a fixed end flexibly in conformation to the size or layout of the stored cables.

Means for Solving the Problems

The present invention involves a cable clamp member for a cable protective guide device for storing and protectively guiding cables for supplying energy from a stationary part of a machine to a moving part of the machine within a bendable main body of lengthy surrounding shape extending from a fixed end mounted on the stationary part of the machine to a moving end mounted on the moving part thereof, the cable clamp member comprising a comb-tooth unit installation receiving member provided in the fixed end or the moving end and including a plurality of engaged parts provided so that a comb-tooth installation position is changeable in a width direction, and a clamp comb-tooth unit member to be detachably engaged with and installed to any one of the plurality of engaged parts to clamp a cable mounted in the installed state to the device.

The present invention according to Claim 2 involves, the plurality of engaged parts which are are provided on the comb-tooth unit installation receiving member at narrow intervals for minutely adjusting the installation pitch of the clamp comb-tooth unit member.

The present invention involves, the respective engaged parts which have the same fitting width, and the clamp comb-tooth unit member is prepared according to a plurality of sizes by providing an engagement part having a common width according to the fitting width and a cable mounting part having a size width according to different diameters of cables.

EFFECTS OF THE INVENTION

The present invention of the structure of the cable clamp member comprises the comb-tooth unit installation receiving member provided at the fixed end and at the moving end and including a plurality of engaged parts capable of changing the installation position of the clamp comb-tooth unit member in the width direction, and the clamp comb-tooth unit member to be detachably engaged with and installed to any one of the plurality of engaged parts to clamp a cable mounted in the installed state to the device.

According to the structure, preparation of a plurality of complicated dies can be dispensed with to reduce the manufacturing cost, since the clamp comb-tooth unit member and the comb-tooth unit installation receiving member can be separately constituted. Further, by separately constituting them, only a necessary number of comb-tooth unit members can be prepared according to the number of stored cables, and the waste of parts can be eliminated to reduce the providing cost to customers.

The present invention of the cable clamp member can have the following effect, since the plurality of engaged parts are provided on the comb-tooth unit installation receiving member at narrow intervals for minutely adjusting the installation pitch of the clamp comb-tooth unit member in addition to the structure of the first embodiment.

Namely, the clamp comb-tooth unit member can be installed to an optional engaged part according to the layout of stored cables since the installation pitch of the engaged parts for installing the comb-tooth unit installation receiving member is fine. Therefore, the stored cables can be surely clamped to the device flexibly in conformation to the layout of the stored cables, and the application of unreasonable force to the cables during movement of the device can be avoided to prevent the damage of the cables.

The present invention of the cable clamp member can have the following effect, since the respective engaged parts have the same fitting width, and the clamp comb-tooth unit member is prepared according to a plurality of sizes by providing an engagement part having a common width according to the fitting width and a cable mounting part having a size width according to different diameters of cables Namely, a clamp comb-tooth unit member of different size can be optionally installed to any engaged part, since the width of the engagement part to be fitted to the engaged part of the comb-tooth unit installation receiving member is set to a common width usable in common to all the engaged parts, while a plurality of sizes are prepared for the width of the cable mounting part for mounting the cable of the clamp comb-tooth unit member according to the size of cable diameters. Therefore, the stored cables can be surely clamped to the device end part flexibly in conformation to the size or layout of cables to be stored, and the slippage in motion between the stored cables and the device during movement of the device can be suppressed to prevent the damage of the stored cables.

The cable clamp member of the present invention for a cable protective guide device for storing and protectively guiding cables for supplying energy from a stationary part of a machine to a moving part of the machine within a bendable main body of lengthy surrounding shape extending from a fixed end mounted on the stationary part of the machine to a moving end mounted on the moving part thereof comprises a comb-tooth unit installation receiving member provided at the fixed end or at the moving end and including a plurality of engaged parts provided so that a comb-tooth installation position is changeable in a width direction, and a clamp comb-tooth unit member to be detachably engaged with and installed to any one of the plurality of engaged parts to clamp a cable mounted in the installed state to the device, whereby preparation of complicated dies can be dispensed with to reduce the manufacturing cost, since the clamp comb-tooth unit member and the comb-tooth unit installation receiving member can be separately constituted, and by separately constituting them, only a necessary number of comb-tooth unit members can be prepared according to the number of cables to be stored to reduce the providing cost for customers. The cable clamp member can have any concrete form if it can realize the above advantages.

The cable protective guide device referred to in the present invention means a cable protective guide device suitable for safely and surely protecting and guiding cables such as electric cables for transmitting an electric signal or supplying electric power, or hoses for supplying oil pressure or air pressure, which connect a moving part to a stationary part in an industrial machine, a semiconductor chip mounter, a vehicle or the like even during movement of the moving part, as well as storing the cable.

Concretely, the structure of the main body can be formed by mutually connecting a number of rectangular link frame bodies long through connecting pins or the like, each of the link frame bodies comprising a pair of right and left link plates, and a bending inner circumferential-side connecting plate and a bending outer circumferential-side connecting plate, which are connected with both the link plates on the bending inner circumferential side and on the bending outer circumferential side, respectively, as described later, or formed by mutually connecting a number of box bodies composed of upper, middle and lower frames long through connecting pins or the like, or formed into composed of a lengthy surrounding body bendably formed in an integrated manner.

These and other effects of the invention will be understood when reference is made to the Brief Description of the Drawings, Description of the Invention and Claims which follow hereinbelow.

The drawings will be better understood when reference is made to the Description of the Invention and Claims which follow hereinbelow.

DESCRIPTION OF THE INVENTION

EXAMPLE 1

Figure 1:
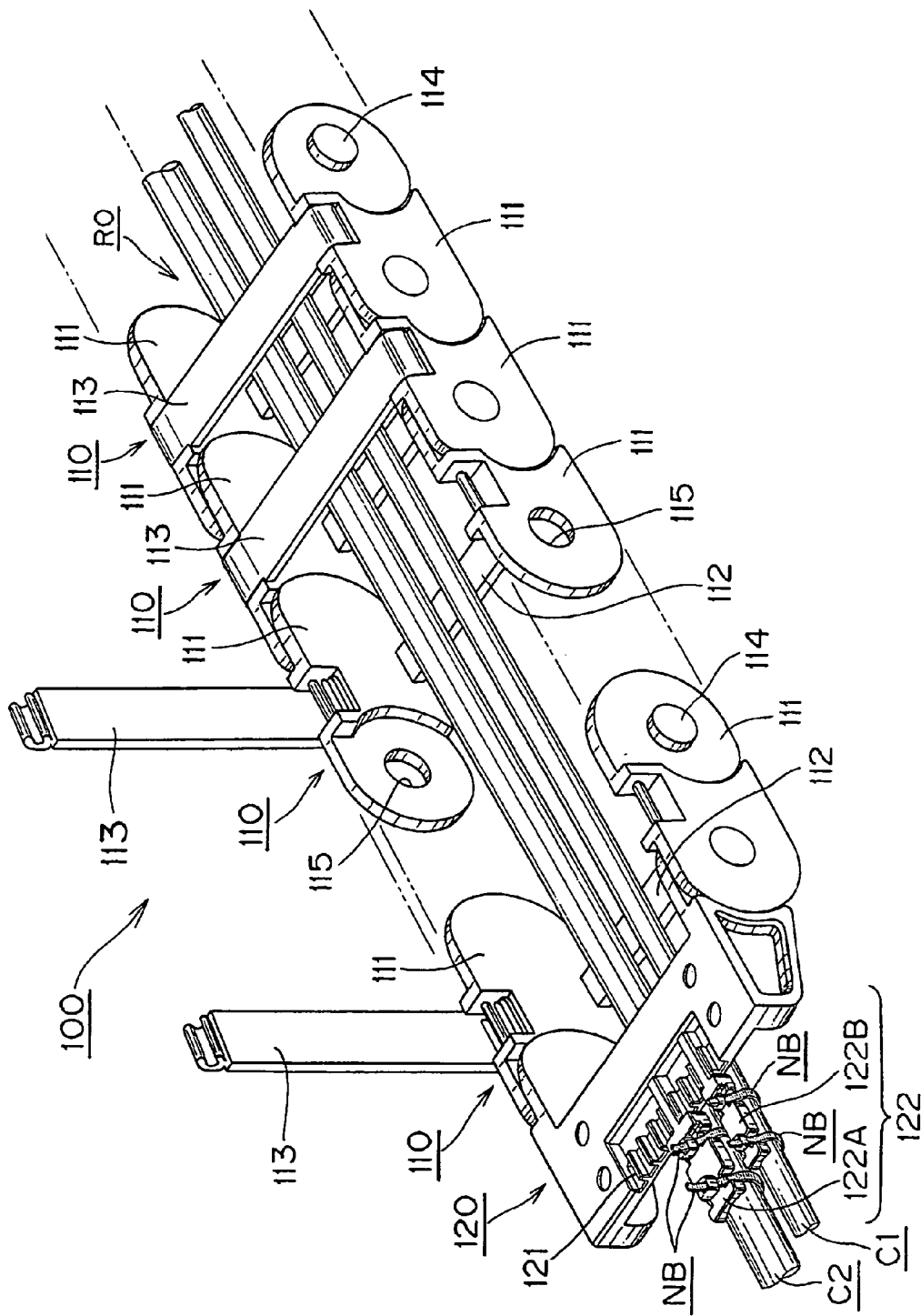
FIG. 1 is an overall perspective view of a cable protective guide device to which a cable clamp member of the present invention is applied.

Example 1 of the cable clamp member of the present invention will be described with reference to FIGS. 1 to 3. FIG. 1 is a perspective view of a cable protective guide device 100 to which the cable clamp member of the present invention is applied. As shown in FIG. 1, the cable protective guide device 100 according to the present invention is used to protectively guide cables C (C1, C2) such as cables or hoses for supplying energy such as electric power or compressed air, for example, from a stationary part of an industrial machine (e.g., a semiconductor chip mounter, a machine tool, etc.) to a moving part of the machine, and formed by mutually connecting, for example, a number of rectangular link frame bodies 110 long, so that it can present a linear state or a bent state according the moving behavior between the moving part and the stationary part of the industrial machine not shown, and protectively guide the cables C (C1, C2) in a cable storage space RO continuously formed by the link frame bodies 110 in a state where they are inserted therethrough.

The link frame bodies 110 are molded of, for example, a glass fiber-reinforced polyamide-based resin which can exhibit an excellent strength characteristic, in which a pair of right and left link plates 111, 111 arranged with a space are integrated with a bending inner circumferential-side connecting plate 112 and a bending outer circumferential-side connecting plate 113 laterally laid on the bending inner circumferential side and on the bending outer circumferential side of the link plates 111, 111, respectively, in a rectangular shape.

The bending inner circumferential-side connecting plate 112 is integrated with the pair of right and left link plates 111, 111 by injection molding, while one end of the bending outer circumferential-side connecting plate 113 is rotatably connected to one of the link plates 111, and the other end is openable and closable to be engageable with the other link plate 111.

Each link plate 111 has a so-called offset structure having a step in the plate thickness direction between the forward side and backward side of the plate, and the link plate 111 further has a connecting pin 114 on the backward side and a connecting pin hole 115 with substantially the same diameter as the connecting pin 114 at the forward side.

Therefore, the link frame bodies 110 are mutually connected by fitting the connecting pin 114 into connecting pin hole 115 of the continuously arranged link plates 111, 111, so that they can be bent within a regulated angle range about the connecting pin 114.

Figure 2:
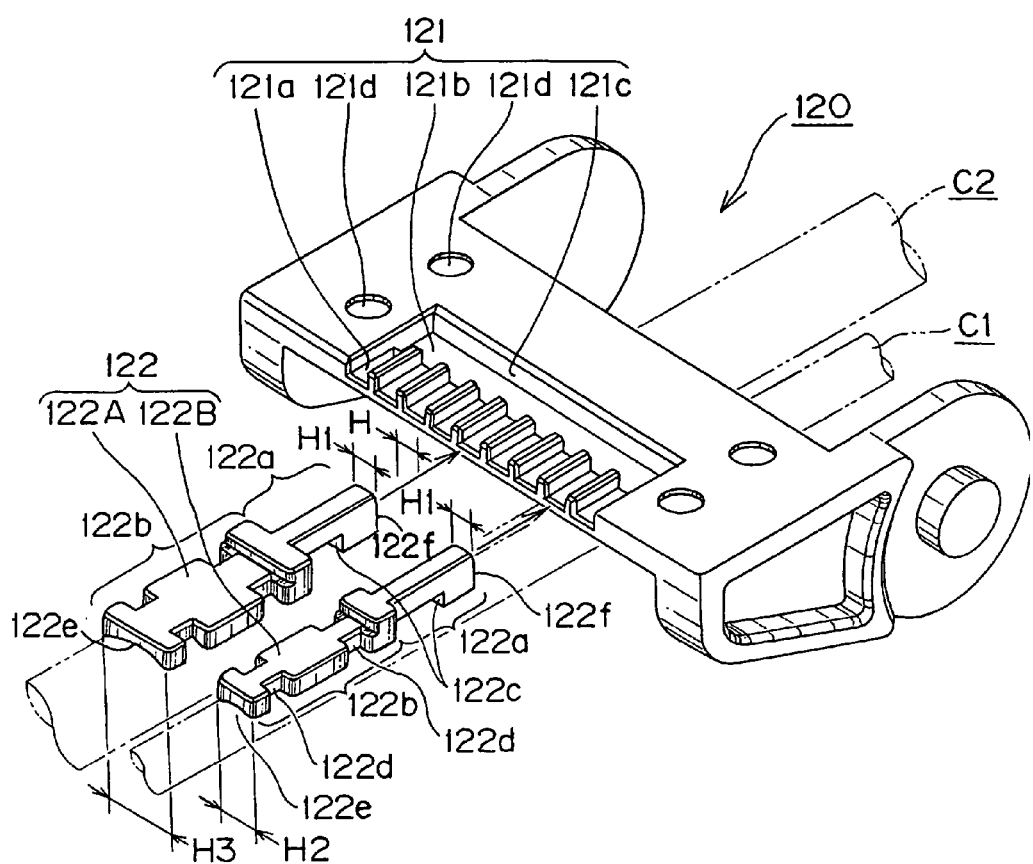
FIG. 2 is an enlarged perspective view illustrating the state before assembling of a cable clamp member shown in FIG. 1.

In this example, as shown in FIG. 2, a comb-tooth unit installation receiving member 121 (hereinafter referred simply to as a receiving member) including a plurality of engaged parts 121a provided so that the installation position of a clamping comb-tooth unit member 122 (122A, 122B) (hereinafter simply referred to as a comb-tooth) is changeable in a width direction, and the substantially bar-like comb tooth 122 (122A, 122B) to be detachably engaged with and installed to any one of the plurality of engaged parts 121a to clamp the cables C (C1, C2) mounted in the installed state to the device 100 are provided in a shelf receiving-shaped moving end (referred also to as a bracket) 120 set at an end of the cable protective guide device 100 or in a fixed end not shown having the same structure as the moving end. The width direction referred to herein means the lateral direction of connecting the pair of right and left link plates to each other.

The plurality of engaged parts 121a are provided on the receiving member 121 at narrow intervals (H) in order to minutely adjust the installation pitch of the comb-tooth 122 (122A, 122B).

The receiving member 121 has, as the engaged parts 121a, recessed shapes formed among a plurality of walls extending in the longitudinal direction of the cable protective guide device 100. The receiving member 121 includes a fitting groove part 121b for preventing the dropping-out of the comb-tooth 122 from the receiving member 121 in the longitudinal direction of the device 100 according to the movement of the cables C attached to the comb-tooth 122 (122A, 122B).

The comb-tooth 122 (122A, 122B) includes a fitting projection part 122c to be fitted with the fitting groove part 121b, the fitting projection part being formed in an engagement part 122a to be engaged with the engaged part 121a. The comb-tooth 122 (122A, 122B) includes a band fixing groove 122d for preventing lateral slippage of a band NB formed of, for example, Nylon (trademark), the band fixing groove being formed in a cable mounting part 122b for mounting the cables C to be clamped to the device, and a cable receiving curved surface 122e following the outer circumferential shape of the cables C to be clamped to the device.

According to the structure of Example 1, the comb-tooth 122 can be easily attached and detached only by simply fitting the engagement part 122a of the comb-tooth 122 to the recessed-shaped engaged part 121a and the fitting groove part 121b of the receiving member 121.

In Example 1, each recessed-shaped engaged part 121a of the receiving member 121 has the same fitting width (H). The comb-tooth 122A and the comb-tooth 122B are prepared according to a plurality of sizes by setting the width of the engagement part 122a of the comb-tooth 122 to be engaged with the recessed shaped engaged part 121a to a common width (H1) according to the fitting width (H), and setting the width of the cable mounting part 122b for mounting the cables C or the width of the cable receiving curved surface 122e to size widths (H2 and H3) according to different diameters of the cables C. A condition necessary for fitting the recessed-shaped engaged part 121a with the engagement part 122a by elastic force, or the relation of H=H1 or H≈H1 and H≦H1≦H2<H3 is established among H, H1, H2 and H3.

In this example, when the comb-tooth 122 is fitted to the receiving member 121, a longitudinal end surface 112f of the engagement part 122a formed on the comb tooth 122 abuts on a fitting wall surface 121c of the receiving member 121.

An actual installation and usage pattern of the cable clamp member (the receiving member 121 and the comb-tooth 122) of Example 1 will be described.

Figure 3:
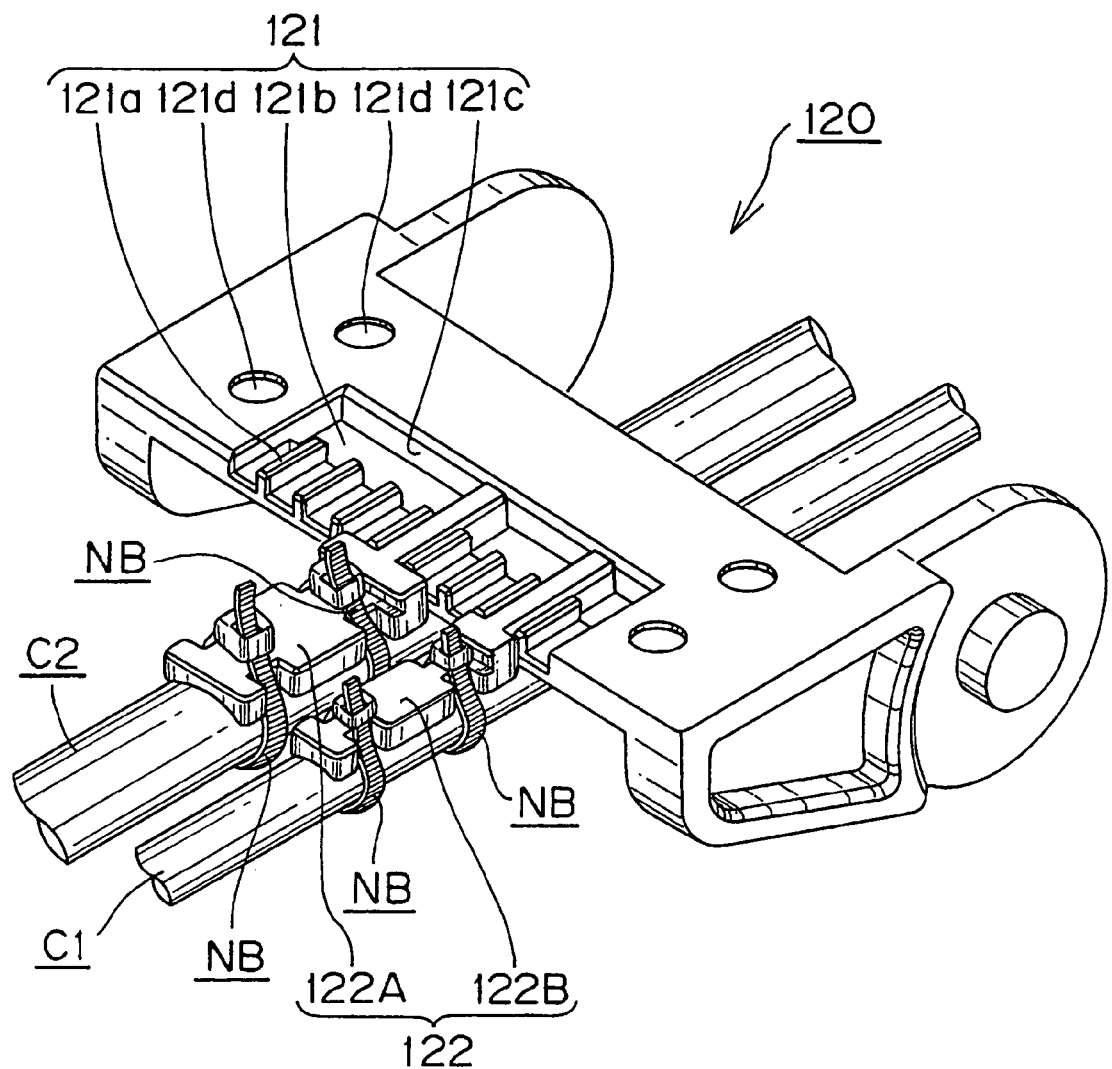
FIG. 3 is an enlarged perspective view illustrating the assembling completed state of the cable clamp member shown in FIG. 1.

As shown in FIG. 1, for example, when two cables in total of a minor-diameter cable C1 and a major-diameter cable C2 are put through a cable storage space RO of the cable protective guide device 100, the comb-tooth 122B having the narrow cable mounting part 122b matched to the diameter width of the cable C1 is engagingly installed to an engaged part 121a of the receiving member 121 that has the closest positional relation with the cable C1 stored in the cable storage space RO (refer to FIG. 3). In this case, the comb-tooth 122A having the broad cable mounting part 112b matched to the diameter width of the cable C2 is engagingly installed to an engaged part 121a of the receiving member 121 that has the closest positional relation to the cable C2 stored in the cable storage space RO (refer to FIG. 3).

As a concrete installation method of the comb-tooth 122 (122A, 122B), a fitting projection part 122c of the comb-tooth 122 is arranged near above the fitting groove part 121b located on the deep side of a desired engaged part 121a of the receiving member 121, and the comb-tooth 122 is lowered toward the receiving member 121 to fit the fitting projection part 122c with the fitting groove part 121b and also fit a predetermined area of the engagement part 122a to the desired engaged part 121a.

Then, the cable C2 and the cable C1 are allowed to abut on the respective cable receiving curved surfaces 122e, 122e of the comb tooth 122A and the comb-tooth 122B engagingly fitted to the receiving members 121, and the cable C2 and the cable C1 are fixed to the comb-tooth 122A and to the comb-tooth 122B by bands NB, respectively.

The bands NB are used so as to be fitted to the band fixing grooves 122d formed in the comb tooth 122 (122A, 122B). In this example, two bands NB are used for one comb tooth 122 to clamp the cables C to the cable protective guide device 100.

EXAMPLE 2

Example 2 of the cable clamp member according to the present invention will be described with reference to FIGS. 4 to 6. Example 2 is characterized by a moving end of shelf receiving form (referred also to as a bracket) 220 and a fixed end not shown of the same structure as this moving end. Since the other main body part (the part where a plurality of link frame bodies are connected) has the same structure as Example 1 described above, the detailed description thereof is omitted while changing only the reference numbers thereof to 200s.

Namely, while the cable clamp member of Example 1 is adapted to engagingly install the comb-tooth 122 to the recessed-shaped engaged part 121a formed in the receiving member 121 of the moving end 120, the cable clamp member of Example 2 comprises a receiving member 221 having columnar projection-shaped engaged parts 221a instead of the recessed-shaped engaged parts 121 of Example 1, and a substantially bar-like comb-tooth 222 having a fitting hole 222c to be fitted to the columnar engaged parts 221a bored in an engagement position, instead of the fitting projection part 122c of Example 1, so that the comb tooth 222 is engagingly installed to the columnar engaged part 221a formed in the receiving member 221.

In the structure of Example 2, also, the comb-tooth 222 can be easily attached and detached only by fitting the fitting hole 222c of the engagement part 222a of the comb tooth 222 to the columnar projection-shaped engaged part 221a of the receiving member 221.

In Example 2, each columnar projection-shaped engaged part 221a of the receiving member 221 has the same fitting diameter width (R), and is provided at equal narrow intervals in the width direction in order to minutely adjust the installation pitch of the comb tooth 222, and comb-teeth (e.g., 222A and 222B) are prepared according to a plurality of sizes by setting the width of an engagement part 222a to be engaged with the recessed-shaped engaged part 221a to a common hole diameter width (R1) according to the fitting diameter width (R), and setting the width of a cable mounting part 222b for mounting the cables C to size widths (H2 and H3) according to different diameters of the cables C. A condition necessary for fitting the columnar projection-shaped engaged part 221a to the fitting hole 22c of the engagement part 222a by elastic force, or the relation of R=R1 or R≈R1 and H1≦H2<H3 is established among R, R1, H2 and H3.

The comb-tooth 222 shown in Example 2 includes band fixing grooves 222d for fixing bands NB and a cable receiving curved surface 222e following the outer circumferential shape of a cable similarly to the comb tooth 122 shown in Example 1.

Figure 4:
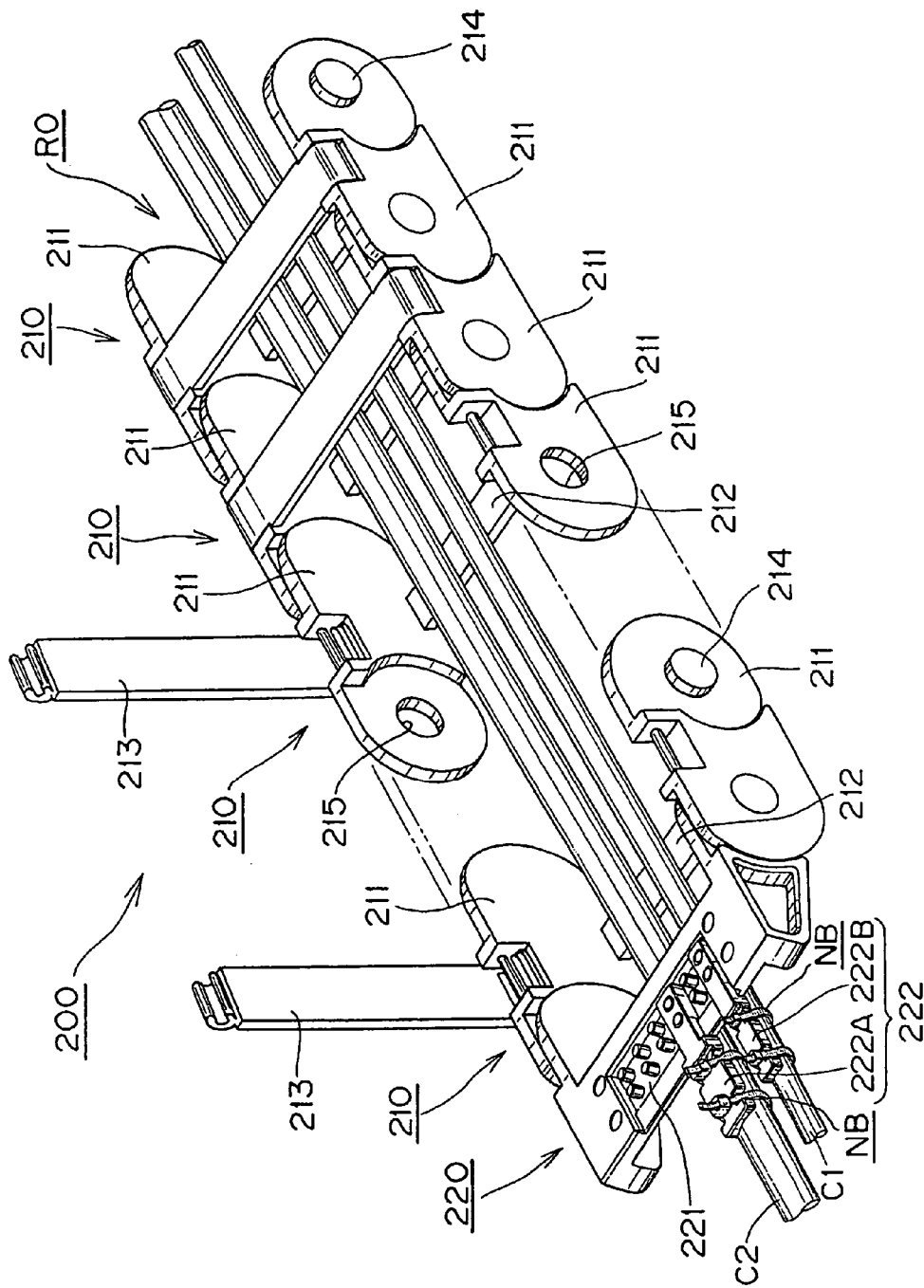
FIG. 4 is a view showing a modified example of the cable clamp member shown in FIGS. 1 to 3.
Figure 5:
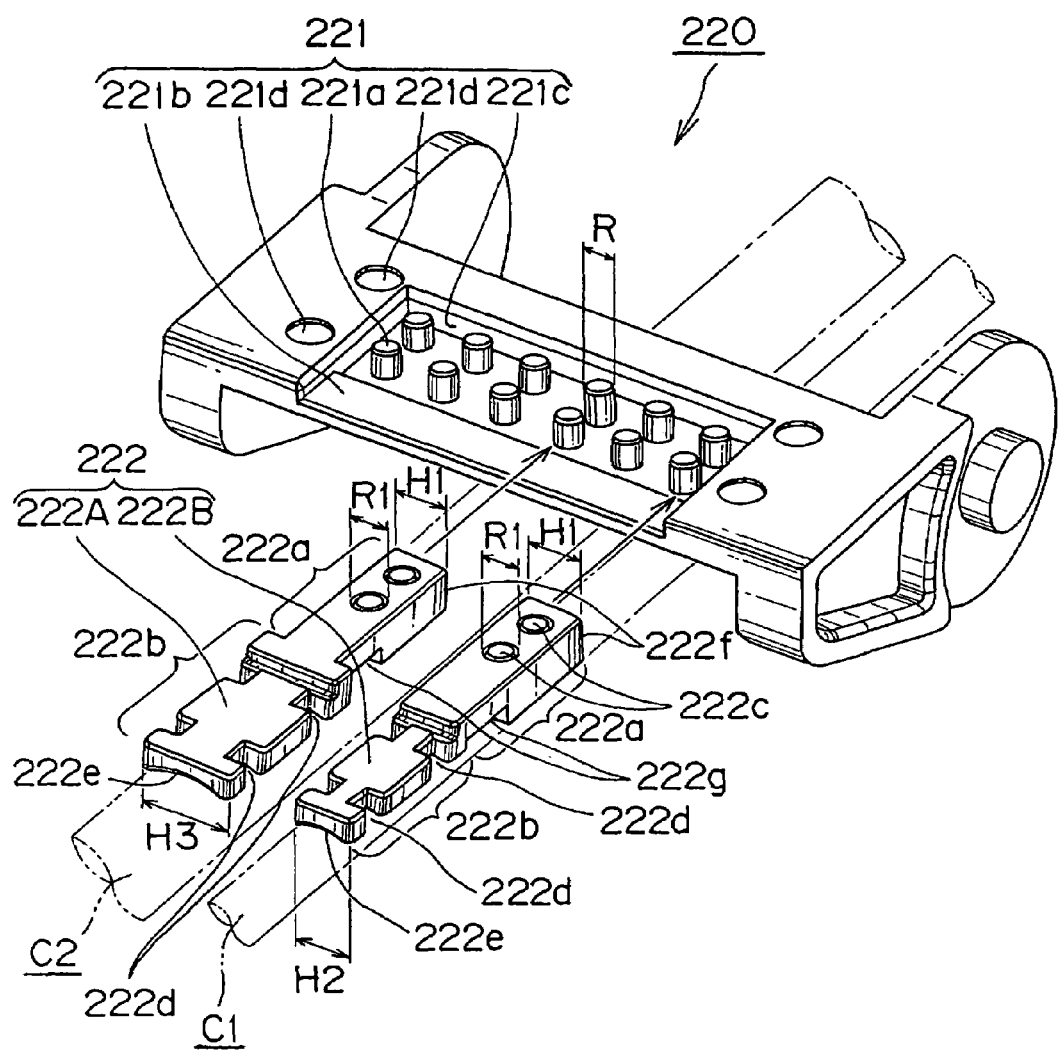
FIG. 5 is an enlarged perspective view illustrating the state before assembling of the cable clamp member shown in FIG. 4.
Figure 6:
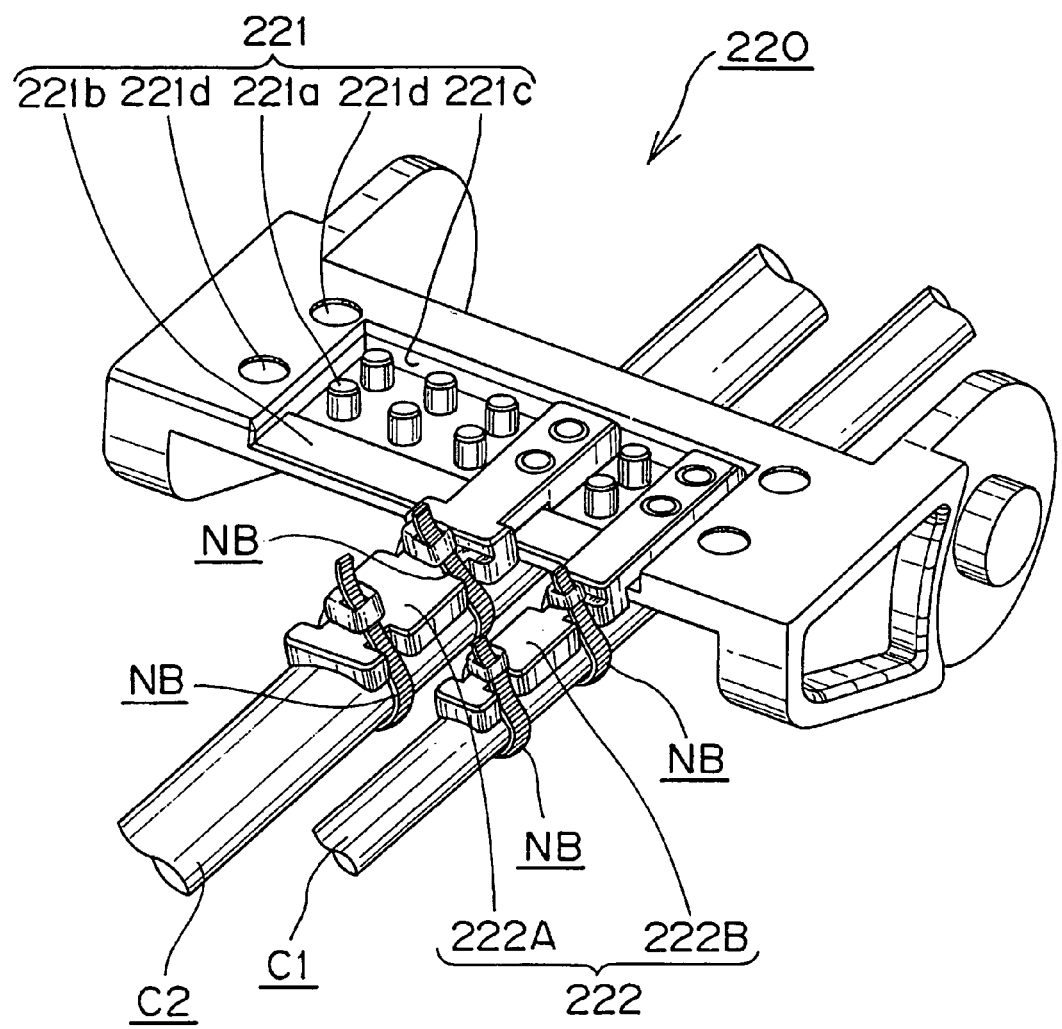
FIG. 6 is an enlarged perspective view illustrating the assembling completed state of the cable clamp member shown in FIG. 4.

In the example of FIGS. 4 to 6, groups of columnar projection-shaped engaged parts 221a arranged at equal intervals are formed in two rows, and two fitting holes 222c to be fitted with two columnar projection-shaped engaged parts 221a, 221a arranged in the device longitudinal direction of the two rows of engaged part groups are bored in the engagement part 222a of the comb-tooth 222 in conformation thereto.

Further, in this example, the receiving member 221 includes a fitting stepped part 221b having a fitting surface situated in a position higher than the face on which the two rows of engaged part groups described above are formed, and the comb tooth 222 includes a fitting groove 222g to be fitted so as to nip the fitting step part 221b, the fitting groove being formed in the engagement part 222a in conformation to the shape of the fitting stepped part 221b. According to this, the fitting force of the receiving member 221 with the comb-tooth 222 can be enhanced to prevent the comb-tooth 222 from being easily dropped out upwardly by the stress acting on the clamped stored cable during movement of the device.

In this example, when the comb-tooth 222 is fitted to the receiving member 221, a longitudinal end surface 222f of the engagement part 222a formed on the comb-tooth 222 abuts on a fitting wall surface 221c of the receiving member 221.

In the example of the drawings, two rows of engaged part groups are formed in the receiving member 221, and two fitting holes 222c are formed in the comb-tooth 222. However, the engaged part group may be formed in a row or in two or more rows without being limited to two rows.

An actual installation and usage pattern of the cable clamp member (the receiving member 221 and the comb-tooth 222) of Example 2 will be described.

As shown in FIG. 6, when two cables in total of a minor-diameter cable C1 and a major-diameter cable C2 are put through the cable storage space of the cable protective guide device 200, for example, the comb-tooth 222B having the narrow cable mounting part 222b matched to the diameter width of the cable C1 is engagingly installed to a columnar projection-shaped engaged part 221a of the receiving member 221 that has the closest positional relation with the cable C1 stored in the cable storage space. In this case, the comb-tooth 222A having the broad cable mounting part 222b matched to the diameter width of the cable C2 is engagingly installed to a columnar engaged part 221a of the receiving member 221 that has the closest positional relation to the cable C2 stored in the cable storage space.

As a concrete installation method of the comb-tooth 222 (222A, 222B), the fitting hole 222c of the engagement part 222a is arranged above a desired columnar engaged part 221a of the receiving member 221, and the comb-tooth 222 is lowered toward the receiving member 221 to fit the fitting hole 222c with the desired columnar engaged part 221a.

Then, the cable C2 and the cable C1 are allowed to abut on the respective cable receiving curved surfaces 222e, 222e of the comb tooth 222A and the comb-tooth 222B engagingly installed to the receiving member 221, and the cable C2 and the cable C1 are fixed to the comb-tooth 222A and to the comb-tooth 222B by bands NB, respectively.

The bands NB are used so as to be fitted to the band fixing grooves 222d formed in the comb tooth 222. In Example 2, also, two bands NB are used for one comb tooth 222 to clamp the cable C to the cable protective guide device 200 similarly to Example 1.

The comb-tooth (122, 222) shown in Examples 1 and 2 is engagingly installed to the receiving member (121, 221) of the moving end (120, 220) or the fixed end (not shown) so that the cable receiving curved surface (122e, 222e) formed in the cable mounting part (122b, 222b) is substantially in the same position level as the cable storage space OR-side inner wall of the moving end (120, 220). Further concretely, the cable receiving curved surface (122e, 222e) is formed so that the circular arc center part thereof is in the same position level as the above-mentioned inner wall. According to this, the damage of cables due to the abutment on the fitting stepped part can be prevented.

EXAMPLE 3

Figure 7:
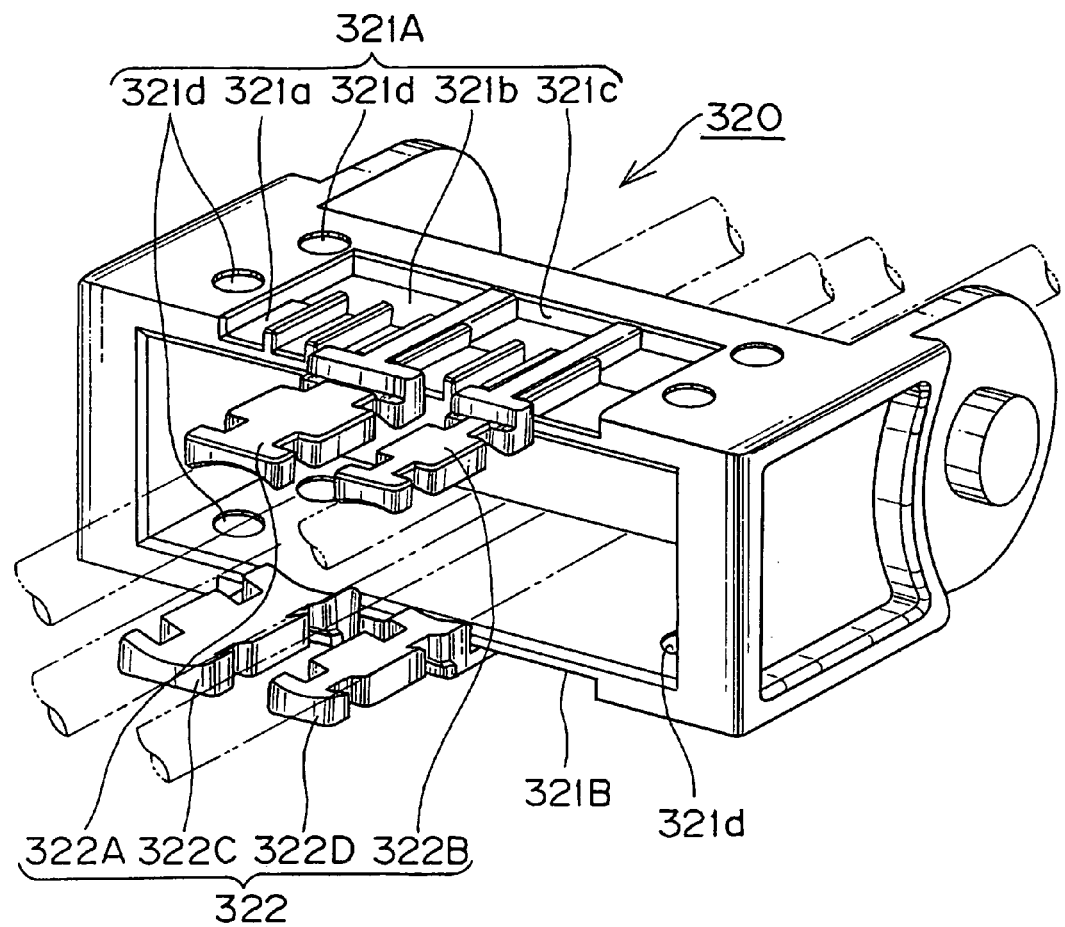
FIG. 7 is a view showing another modified example of the cable clamp member.

Example 3 of the cable clamp member according to the present invention will be described with reference to FIG. 7. Example 3 shows a rectangular moving end 320 of clamp member two-stage structure, which comprises receiving members 321 (321A and 321B) of the same structure as the receiving member 121 shown in Example 1 described above, which are vertically provided in two stages of the bending outer circumferential side and the bending inner circumferential side of the cable protective guide device, and comb-tooth unit members 322 (322A and 322B, 322C and 322D) of the same structure as the comb-tooth 122 shown in Example 1 to be engagingly installed to the two-tiered receiving members 321 (321A and 321B), respectively. Since the other structure is the same as in Example 1, the detailed description thereof is omitted.

EXAMPLE 4

Figure 8:
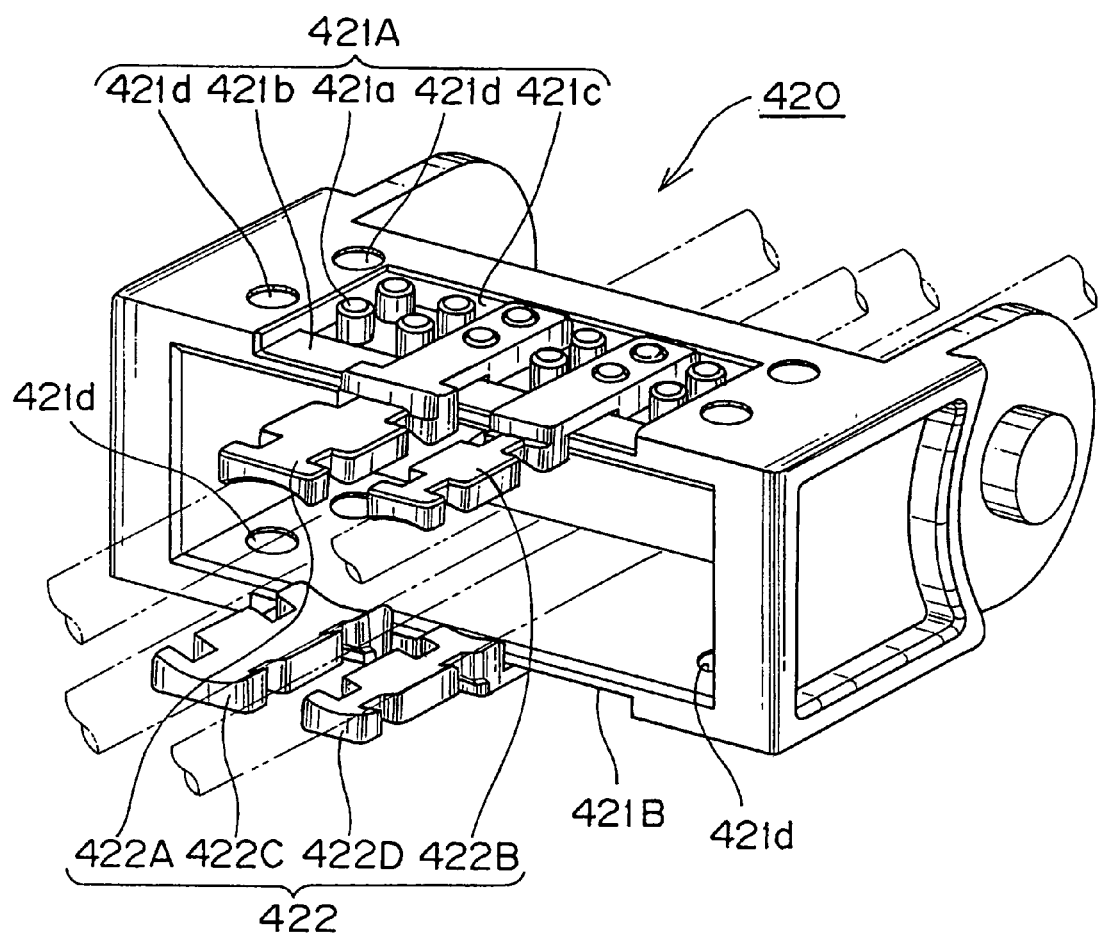
FIG. 8 is a view showing the other modified example of the cable clamp member.

Example 4 of the cable clamp member according to the present invention will be described with reference to FIG. 8. Example 4 shows a rectangular moving end 420 of clamp member two-stage structure, which comprises receiving members 421 (421A and 421B) of the same structure as the receiving member 221 shown in Example 2 described above vertically provided in two stages of the bending outer circumferential side and the bending inner circumferential side of the cable protective guide device, and comb-tooth unit members 422 (422A and 422B, 422C and 422D) of the same structure as the comb-tooth 222 shown in Example 2 to be engagingly installed to the two-tiered comb-tooth unit member installation receiving members 421 (421A and 421B).

According to the structures of Examples 3 and 4 described above, when the cable clamp member is applied to the form of dividing and storing cables in two upper and lower stages of the bending outer circumferential side and the bending inner circumferential side within the cable storage space RO by a partition shelf board member or the like, for example, the two-tiered cables can be surely clamped to the device at the end of the moving end or fixing end while being divided to the bending outer circumferential side and the bending inner circumferential side. Therefore, the slippage in motion between the two-tiered cables and the device during movement of the device can be suppressed to prevent the damage of the stored cables.

In a concrete manufacturing method of the cable clamp member comprising the receiving member and the comb-tooth shown in each example, respective exclusive dies are prepared.

Namely, a die for manufacturing the moving end or fixed end provided with the receiving member, and dies for manufacturing comb-teeth by size are prepared. Using these dies, the moving end (or fixed end) provided with the receiving member and the comb-teeth by sizes are manufactured, for example, out of a glass fiber-reinforced polyamide-based resin material or the like.

According to such a manufacturing method of the present invention, since the die for manufacturing the moving end or fixed end provided with the receiving member can be simplified, the manufacturing cost of manufacturing the cable clamp member can be suppressed low, compared with a conventional manufacturing method which requires preparation of a plurality of complicated dies for manufacturing the moving end or fixed end integrated with the mounting unit shown in the above description of the related art.

Particularly, the form of preparing only two sizes for the comb-teeth by size can further suppress the manufacturing cost low since the dies for manufacturing the comb-teeth is minimized.

In each example described above, the receiving member is formed in the moving end of the cable protective guide device or the fixed end not shown thereof in an integrated manner. The present invention is not limited thereby, and can be applied to a form in which a separate receiving member can be connected to the moving end or fixed end. In this case, connecting means (e.g., a fitting projection part and a fitting hole part, etc.) for connecting the moving end or fixed end to the receiving member are formed on both the end part side of the moving end or fixed end and on the receiving member side, respectively.

In such a form of constituting the receiving member separately from the moving end or fixed end, the cable clamp member can be manufactured by use of a simpler die than in the form of forming the receiving member on the moving end or fixed end in an integrated manner. Therefore, the manufacturing cost can be further reduced, compared with the above-mentioned case.

The moving end 120, 220, 320, or 420 shown in each of the examples, or the fixed end not shown is attached to a moving part or stationary part of an industrial machine not shown through a mounting hole 121d, 221d, 321d, or 421d by use of a mechanical part such as bolt and nut.

Finally, since the cable clamp member of the above-mentioned structure comprises the receiving member having a plurality of engaged parts provided so that a comb-tooth installation position is changeable in a width direction and the comb-tooth to be detachably engaged with and installed to any one of the plurality of engaged parts to clamp a cable mounted in the installed state to the device, the comb-tooth and the receiving member can be separately constituted without preparing a plurality of complicated dies, and the manufacturing cost can be reduced. Further, by separately constituting them, only a necessary number of comb-teeth according to the number of stored cables can be prepared, and the waste of parts can be eliminated to reduce the providing cost for customers.

Since the plurality of engaged parts are provided on the receiving member at narrow intervals so as to minutely adjust the installation pitch of the comb-tooth in addition to the above structure, or the installation pitch of the engaged parts for installing the receiving member is fine, the comb-tooth can be installed to an optional engaged part according to the layout of the stored cables in addition to the above effect, and the stored cables can be surely clamped to the device flexibly in conformation to the layout of the stored cables, and application of unreasonable force to the cables during movement of the device can be avoided to prevent the damage of the cables.

Further, each engaged part has the same fitting width, and the clamp comb-tooth unit member is prepared according to a plurality of sizes by providing an engagement part having a common width according to the fitting width and a cable mounting part having a size width according to different diameters of cables in addition to the above structure. Therefore, a comb-tooth of different size can be optionally installed to any engaged part since the width of the engagement part to be fitted with the engaged part of the receiving member is set to the common width usable in common for all the engaged parts while a plurality of sizes are prepared for the width of the cable mounting part for mounting the cable of the comb-tooth according to the diameter sizes of cables, and the stored cables can be surely clamped to the device end flexibly in conformation to the size or layout of the cables to be stored, and the slippage in motion between the stored cables and the device during movement of the device can be suppressed to prevent the damage of the stored cables.

Further, since the comb tooth has the band fixing groove for arresting the longitudinal slippage of a clamp means (a band or the like) for clamping the stored cable to the comb-tooth, in addition to the above structure, the clamp means (band) can be prevented from being shifted in the longitudinal direction by the stress acting on the clamped stored cable, and the slippage in motion between the stored cable and the device during movement of the device can be suppressed.

Further, since the comb-tooth has the cable receiving curved surface following the outer circumferential shape of the stored cable in addition to the above structure, the stored cable to be clamped can be closely made into contact with the comb-tooth, and the stored cable can be surely clamped by use of the clamp means (band).

EXPLANATION OF REFERENCE NUMERALS

100, 200 Cable protective guide device
110, 210 Link frame body
111, 211 Link plate
112, 212 Bending inner circumferential-side connecting plate
113, 213 Bending outer circumferential-side connecting plate
114, 214 Connecting pin
115, 215 Connecting pin hole
120, 220, 320, 420 Moving end
121, 221, 321, 421 Comb-tooth unit installation receiving member
121a, 321a Recessed-shaped engaged part
121b, 321b Fitting groove part
121c, 221c, 321c, 421c Fitting wall surface
121d, 221d, 321d, 421d Mounting hole
122, 222, 322, 422 Clamp comb-tooth unit member
122a, 222a Engagement part
122b, 222b Cable mounting part
122c Fitting projection part
122d, 222d Band fixing groove
122e, 222e Cable receiving curved surface
122f, 222f Longitudinal end surface
222g Fitting groove
221a, 421a Columnar engaged parts
222c Fitting hole
C1, C2 Cables
RO Cable storage space
NB Band The invention has been disclosed and described herein by way of example and those skilled in the art will readily recognize that changes may be made to the invention as described herein without departing from the spirit and scope of the claimed invention.

The invention claimed is:

1. A cable clamp member for a cable protective guide device for storing and protectively guiding cables for supplying energy from a stationary part of a machine to a moving part of the machine within a bendable body of lengthy surrounding shape extending from a fixed end mounted on the stationary part to a moving end mounted on the moving part of the machine, the cable clamp member comprising:
   a comb-tooth unit installation receiving member provided on the fixed end or the moving end and including a plurality of engaged parts provided so that a comb-tooth installation position is changeable in a width direction; and
   a clamp comb-tooth unit member to be detachably engaged with and installed to any one of the plurality of engaged parts to clamp a cable mounted in the installed state to the cable protective guide device.

2. The cable clamp member according to claim 1, wherein the plurality of engaged parts are provided on the comb-tooth unit installation receiving member at narrow intervals so as to minutely adjust the installation pitch of the clamp comb-tooth unit member.

3. The cable clamp member according to claim 1, wherein the respective engaged parts have the same fitting width, and the clamp comb-tooth unit member is prepared according to a plurality of sizes by providing an engagement part having a common width according to the fitting width and a cable mounting part having a size width according to different diameters of cables.

4. The cable clamp member according to claim 2, wherein the respective engaged parts have the same fitting width, and the clamp comb-tooth unit member is prepared according to a plurality of sizes by providing an engagement part having a common width according to the fitting width and a cable mounting part having a size width according to different diameters of cables.

* * * * *